June 5, 1962 W. DOW 3,038,143
TELEMETERING DEPTH METER
Filed Jan. 17, 1956 3 Sheets-Sheet 3

INVENTOR.
WILLARD DOW
BY George Sipkin
Lee I. Huntzberger
ATTORNEYS

3,038,143
TELEMETERING DEPTH METER
Willard Dow, Falmouth, Mass., assignor, by mesne assignments, to the United States of America as represented by the Secretary of the Navy
Filed Jan. 17, 1956, Ser. No. 559,752
18 Claims. (Cl. 340—5)

This invention relates generally to telemetering devices and more particularly to a telemeter depth meter which is utilizable to determine depth, current flow or other information and then transmit such data acoustically through water.

Equipment developed heretofore for oceanographic research man be roughly divided into two classes. The first consists of instruments which, when lowered over the side of the ship, produce a reading or a record which can be inspected when the device is recovered. The Bathythermograph, bucket thermometer, and Nansen Bottle are examples of this type of instrument. These instruments present several advantages. They are simple, rugged, and compact. They are self-contained and thus require no electrical cable to the ship. On the other hand, they present the disadvantages of providing data which may be valid only for a very small area or for the duration of a short space of time and of making such information available only upon recovery of the instrument. In those parts of the world where conditions in the sea are reasonably homogeneous such factors are of minor importance, but in regions where conditions may vary significantly within a relatively small area, or are subject to rapid changes, instruments which can supply continuous information without constant attendance are essential.

The second class of instruments, exemplified by various depths and current meters do provide continuous monitoring, but have the disadvantage of requiring electrical cables to transmit the information to the ship. When such instruments are operated at sea, the cables present the problem of the handling thereof on deck, they readily become tangled with trawl wires, or other gear being towed at the same time and even, on occasion, become fouled in the screws. They may be subjected to such strain and wear as to eventually leak or break and replacement thereof can be a time consuming and expensive process.

It is accordingly, the primary object of the present invention to provide a telemetering depth meter which is rugged, compact, self-contained and capable of supplying continuous information to a ship.

It is a further object to provide a telemetering depth meter as set forth in the preceding object which is capable of operation without attention thereto for relatively long periods of time.

Generally, the present invention comprises a submerged torpedo shaped housing or "fish" which contains a stable heterodyne oscillator, the frequency of which is varied between chosen values by a variable capacitor which in turn is driven by a Bourdon tube sensitive to pressure and having access to the sea. As the telemetering instrument descends, the increasing water pressure causes the Bourdon tube to rotate the capacitor and the frequency of the oscillator increases. The oscillator output is amplified by a power vacuum tube and applied to a transducer in the tail of the fish. The sound radiated by the transducer is picked up by a receiving hydrophone, which is towed behind the ship at the surface. The hydrophone is connected to a tuned receiver in the vessel. As the tuning dial of this receiver is calibrated in terms of frequency, reference may be made to a frequency vs. depth curve to give the depth of the instrument, or alternatively, the dial may be calibrated directly in terms of depth. Current or temperature information can be applied as a modulating signal on the depth "carrier signal" in accordance with the principles outlined above.

Other objects and many of the attendant advantages of this invention will be readily appreciated as the same become better understood by reference to the following detailed description when considered in connection with the accompanying drawings wherein.

Figure 1:
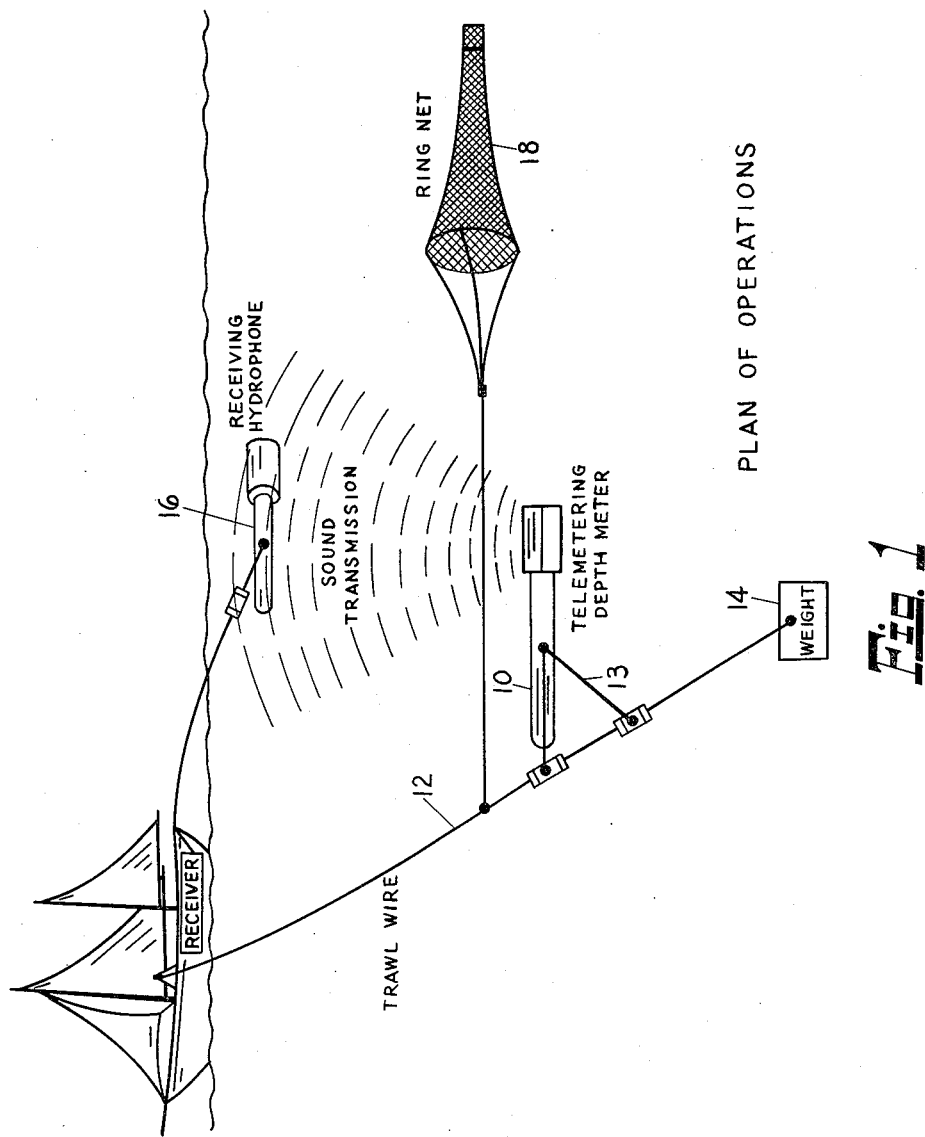
FIG. 1 depicts a plan of operation of the present invention.

Referring now more particularly to FIG. 1, which shows a plan of operation of the present invention, the telemetering depth meter 10 is mounted on a trawl wire 12 in towing position by a triangular bracket 13, a weight 14 being utilized to maintain meter 10 at a desired depth. The acoustic signal radiated by the transducer within depth meter 10 is picked up by a receiving hydrophone 16 which is towed behind the ship at or near the surface of the water. The ring net 18 is shown to illustrate one example wherein the present invention may solve a pressing problem. For example, when it is required to tow plankton nets and fish trawls in scattering layers, the operation requires that the depth of the plankton nets and fish trawls be known and monitored continuously.

Figure 2:
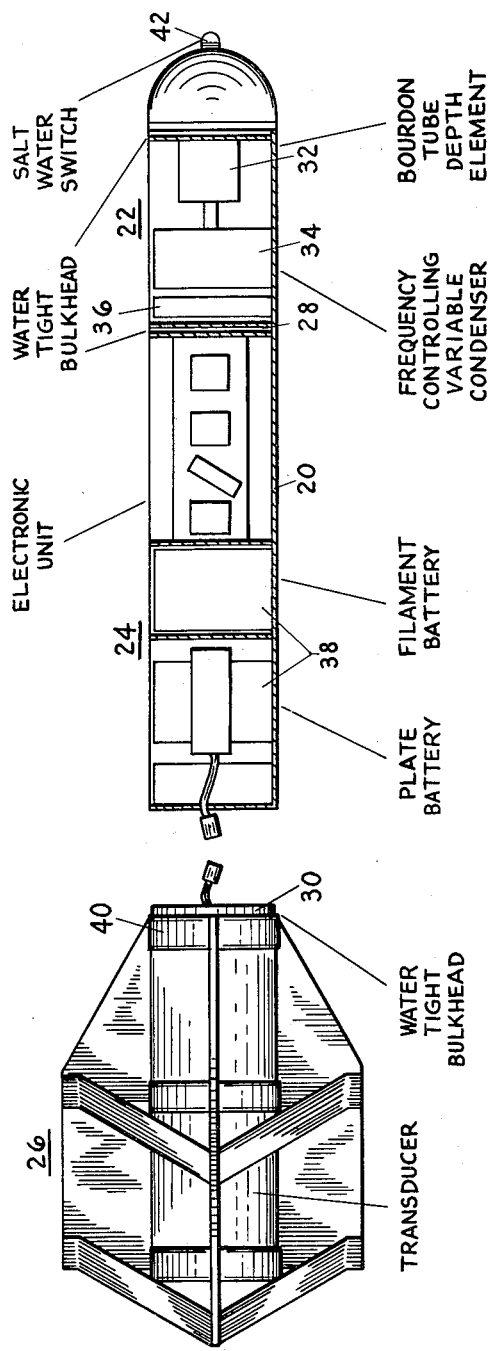
FIG. 2 is a view of the present invention, partly cut away, with the various components contained therein exposed to indicate their physical arrangement.

In FIG. 2, the depth meter is shown. It is to be seen that it is self-contained in the torpedo-shaped housing 20. Housing 20 is divided into three compartments 22, 24, and 26, separated by watertight bulkheads 28 and 30. The forward compartment 22 contains a conventional Bourdon tube 32, a variable capacitor 34 mechanically coupled to the Bourdon tube 32, the variable capacitor 34 being driven by the Bourdon tube as the latter is responsive and changes to increasing pressures with increasing depth. Also included in forward compartment 22 is a relay 36 which acts as a power switch. The middle compartment 24 contains the electronic chassis 37 which generally consists of an oscillator, a detector, a power amplifier and battery stack 38. Since there is only small space available and the desirability of maintaining stable voltages in the oscillator and detector circuits exists, mercury cells may be used in the filament and plate supplies of the various vacuum tubes used in the electronic portion. The filament supply provides the heater voltages for the vacuum tubes and also provides current for relay 36. The aft compartment 26 houses the forward end of the transducer 40, its cable being removable from the rest of the housing 20 as a unit, substantially as shown. Connections between compartments are made by sealed feedthrough connectors. Watertight bulkheads 28 and 30 are provided to prevent damage to the electric portion if either the Bourdon tube 32 or the transducer 40 should leak. Since many of the components contained within housing 20 are conventional and well known in the art, they have been depicted schematically by blocks as their detailed description is believed to be unnecessary. Salt water switch 42 located at the forward end of housing 20 is connected in series with coil of relay 36 and the filament supply portion of battery stack 38. Switch 42 consists of a stainless steel disk separated from housing 20 by an insulator. When the depth meter is lowered into salt water, the circuit is completed by conduction through the water, closing relay 36. Since the contacts of relay 36 are in series with the plate and filament supplies, the depth meter begins to operate. The salt water switch insures that the instrument cannot accidently be left operating when not in use, and thus prolongs battery life.

Figure 3:
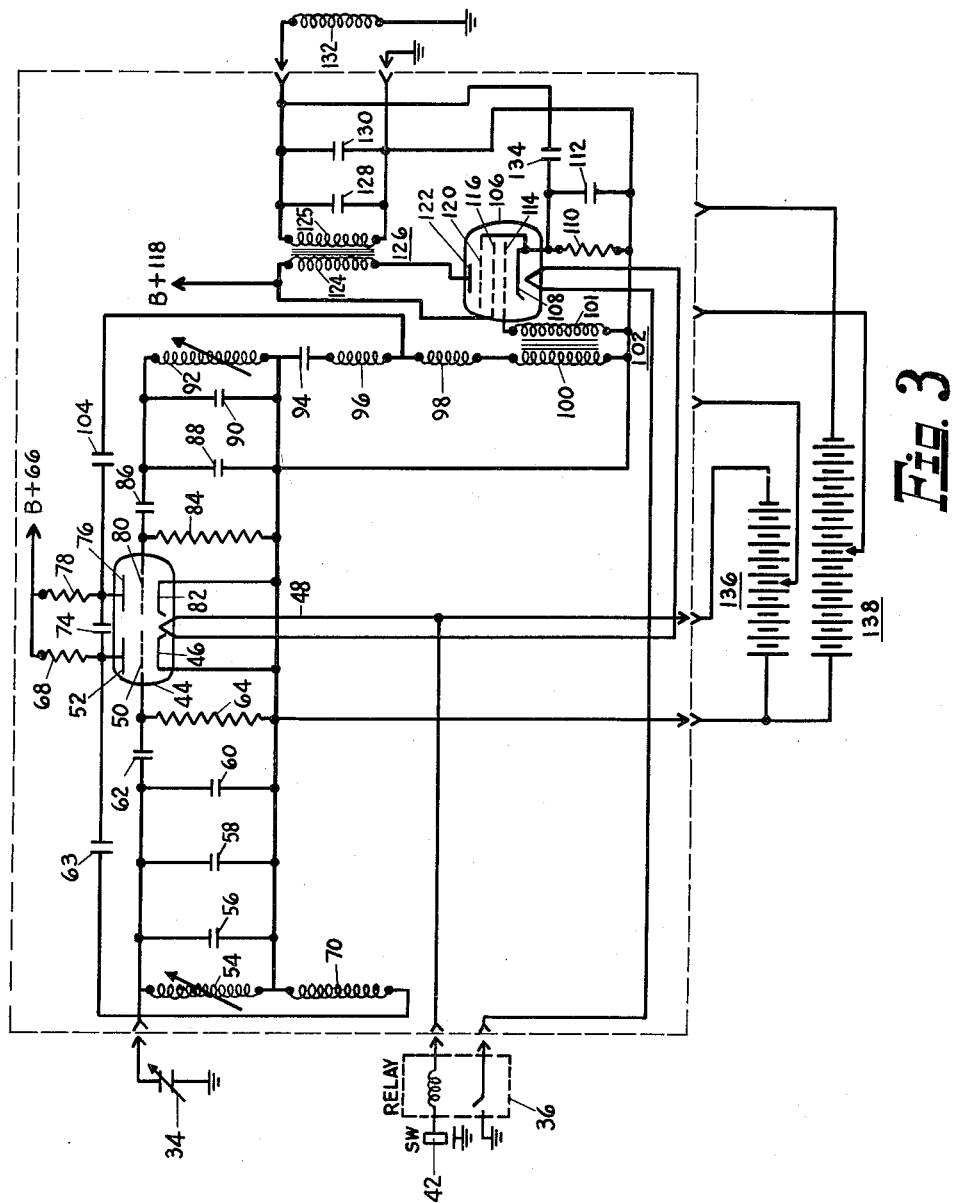
FIG. 3 is a schematic diagram of the electronic portion of the invention.

In FIG. 3, which is a schematic of the electronic portion of the invention, the oscillator comprises one-half of double triode 44 which includes cathode 46 receiving its energization from common filament 48, a grid 50 and a plate 52. The input circuit comprises the parallel combination of variable inductance 54 and capacitances 56, 58 and 60, series connected capacitance 62 and grid resistance 64. Plate 52 is connected to a source of B+ potential 66 through resistance 68. The oscillator is of the shunt feedback type, feedback being effected through capacitance 63 and being accomplished by tight coupling between grid coil 54 and the plate coil 70. The frequency of the oscillation is varied between chosen limits by means of a variable capacitor 34 in shunt with grid coil 54. As explained herein before, the capacitance 34 is varied by Bourdon tube 32 so that, therefore, the oscillator frequency varies with depth of the device.

The detector comprises the other half of double triode 44 with its associated circuitry and is tightly coupled to the oscillator through a small capacitance 74. In tube 44, it includes a plate 76 connected to B+ potential source 66 through resistance 78, a grid 80 and a cathode 82. The output circuit includes resistance 84, series connected capacitance 86, parallel combination of capacitances 88 and 90 and variable inductance 92. The detected signal is passed through a capacitance 94, a coil 96 and an R.F. choke 98 through the primary winding 100 of a step-up transformer 102. Plate 76 is coupled to the junction point of coil 96 and R.F. choke 98 through a capacitance 104.

The power amplifier comprises a pentode vacuum tube and associated circuitry. Tube 106 includes a cathode 108, a cathode resistance 110 bypassed by a capacitance 112, a first grid or control electrode 114, a screen grid electrode 116 connected to a B+ source 118, a suppressor electrode 120 tied to cathode 108, and a plate 122 connected to B+ source 118 through the primary winding 124 of a transformer 126. The input to tube 106 comprises the signal developed across the secondary winding 101 of transformer 102. The output circuit includes primary winding 124 of transformer 126, the secondary winding 125 of which is connected in parallel with capacitances 128 and 130. The output transformer 126 matches the plate circuit of tube 106 to the low impedance transducer 132 schematically depicted as a grounded coil. Cathode 108 is coupled to an intermediate point between secondary winding 125 and transducer 132 through a capacitance 134.

As is shown, when salt water switch 42 is closed energizing relay 36, capacitance 34 is switched into parallel with coil 54, batteries 136 and 138 are switched in to supply filament and plate voltages of tubes 44 and 106 and transducer 132 is connected to the circuit.

Assuming in a given practical circuit, it is decided to provide a signal from the oscillator whose frequency is varied betwen 550 and 576 kc., typical values of the significant circuit components may be as follows: Variable capacitance 34, 20 μμf., capacitances 56 and 58, 130 and 270 μμf. respectively, resistance 64, 0.1 megohm, capacitance 62, 100 μμf, resistances 68 and 78, 22K ohms, respectively, resistance 84, 47K ohms, capacitance 86, 100 μμf., R.F. choke 98, 30 millihenries, resistance 110, 1K ohms, capacitances 128 and 130, 0.02 μf. and 0.05 μf. respectively, and capacitances 112 and 134 10 μf. and 0.01 μf. respectively, tube 44 may suitably be a 12AU7 type and tube 106 a 6AK6 type. The filament supply from the batteries 136 and 138 delivers 20 volts to feed the 12AU7 and the 6AK6 filaments in series, and also provides current for relay 36. Battery 138 provides 200 volts for the power amplifier plate circuit and is provided with a tap at 135 volts to provide oscillator and detector plate voltages. Hydrophone 132 may be of the magnetorestriction type, broadly tuned from the 16th to the 26th kc. range by the capacitance shunted across it, the capacitance also serving to improve the waveform deliverd by the power stage which may be slightly overdrawn to insure maximum output.

In the circuit depicted in FIG. 3, it is seen that numerous precautions have been taken to insure stability. The oscillator and detector are almost identical in their R.F. circuitry, and the actual components used are matched as closely as possible and located symmetrically with respect to tube 44. Also two halves of a single tube are used for the oscillator and detector. Thus any drift due to temperature variation, changes in battery voltage or tube aging affects both circuits in the same way so that they tend to drift together at the same rate and in the same direction. Therefore, their frequency difference, which is a small portion of the total frequency, remains quite constant.

The depth meter may be mounted on the trawl wire by a triangular bracket so that it can always swim parallel to the surface. It is preferable that the bracket be free to swivel about the wire but not move vertically. Such vertical movement can readily be prevented by means of stops. Of course, it is to be realized that both the depth meter and the receiving hydrophone may be clamped to the trawl wire instead of towing receiving hydrophone 16, provided that the transmitter is arranged for "end fire" operation, i.e., that the transmitting hydrophone directs sound up the path of the trawl wire.

Obviously many modifications and variations of the present invention are possible in the light of the above teachings. It is therefore to be understood that within the scope of the appended claims the invention may be practiced otherwise than as specifically described.

I claim:

1. A telemetering device for continuously indicating the depth in a body of water of an instrument which comprises a towing vehicle, a cable, attached at one end to said vehicle, means attached to the other end of said cable for causing the cable to descend in said body of water, means attached to said cable intermediate of the ends of the cable at a substantial distance away from said secured end and responsive to liquid pressure thereon of said body of water where it is located at any time, for automatically emitting into said medium variable acoustic signals corresponding in some characteristic to the water pressure thereon at any time, and means disposed in said body of water, near its surface, connected to but spaced well to the rear from said towing vehicle, and responsive to said signals rceived through the water for indicating through the variations in said characteristic of said signals, the current depth position of said means which is attached to said cable and responsive to the liquid pressure thereon.

2. The device as set forth in claim 1, wherein said signal responsive means is a receiving hydrophone.

3. A telemetering device for continuously indicating the depth in water at which an object is being towed by a ship, which comprises a cable attachable at one end thereof to said ship, a weight on the other end of said cable to cause the cable to descend in said water at an acute inclination depending on the speed of tow, said object whose depth is to be continuously indicated as it is towed by said ship, being attached to said cable closely to but above said weight and automatically responsive to water pressure thereon where it is located at any time and operable to emit into said water acoustic signals variable in some characteristic according to the water pressure thereon and correspondingly varying according to any variation in the water pressure thereon, and means also attachable by cable to said ship adjacent the top of said water for receiving said signals and indicating continuously by said characteristic variations the depth in said water of said means on said cable which is responsive to water pressure thereon and emits said acoustic signals.

4. The device as set forth in claim 3, in which said characteristic of the signal is their frequency.

5. The device as set forth in claim 3, and said ship, wherein said means attachable to the ship and receiving said signals is a receiving hydrophone connected by a cable to said ship to be towed behind and by said ship just beneath the surface, and means on the ship connected to said hydrophone for indicating depths according to the signals received.

6. The device as set forth in claim 3, wherein said automatically responsive means is contained in a closed housing, and includes a switch accessibly to and closed by said water in which said housing may be placed and connected to and making operative the emission of signals only while said housing is immersed in water.

7. The device as set forth in claim 3, wherein said means attached to said cable and responsive to water pressure to emit acoustic signals is carried by a closed housing and hinged to the cable by a triangular bracket to swim parallel to the surface of the water.

8. The method of continuously determining the depth in water at which an object is being towed by a ship, which comprises towing said object submerged in said water by a tow cable descending from said ship, towing from the same cable, in close proximity to said object, an element responsive automatically to the water pressure thereon and propagating in the water acoustic signals variable in some characteristic in accordance with any changes in water pressure on said element, and supplying to said ship by the variations in said signal characteristics the depth in said water at which said object and element are located at any time.

9. The method as set forth in claim 8, in which said characteristic of the signals is their frequency.

10. A telemetering device for continuously indicating the level of an instrument being towed horizontally in a fluid medium relatively to a horizontal reference plane, which comprises towing means supported in said medium and operable horizontally, sound pickup means connected physically and electrically by a flexible cable to said towing means to follow said towing means in said medium and operable to convert sound signals into electrical signals, another flexible cable also connected at one end to said towing means and carrying a weight at its other end in said medium to cause said another cable to descend in said medium at an inclination rearwardly of the direction of tow by said towing means, means connected to said another cable intermediate of its length in said medium, having an adjustable controlling capacitor operated by the pressure of water at the depth to which it may be submerged and for sending upwardly in said medium sound waves having a frequency proportional to its depth below said towing means as determined by the operation of said capacitor for transmission as electrical signals by said first mentioned cable to said towing means.

11. The device according to claim 10, wherein said means connected to said another cable is pivoted to said cable for towing in its horizontal position as said another cable changes its inclination.

12. The device according to claim 10, and a net for collecting specimens, connected to said another cable adjacent the connection to that cable of said sound sending means whereby the depth of said net below said towing means will be continuously indicated by said sound sending means.

13. The device according to claim 10, wherein the connection between said another cable and said sound sending means includes a bracket pivotally connected to said another cable at spaced apart zones along the length of that cable for swivel movements sidewise of said another cable, and also a horizontal pivotal connection between said sound sending means and said bracket, enabling said sound sending means to swim in said medium in a horizontal position with any variations in the angle of inclination of said another cable.

14. A telemetering device for continuously indicating the depth in water at which an object is being towed by a ship, which comprises said ship, a relatively long, flexible cable attached at one end to said ship and at its other end carrying a weighted drag that causes such cable to descend in the water while being towed, means for connecting said object to said cable intermediate of the ends of said cable by which said object may be towed approximately horizontally at a desired level, a depth meter connected to that part of said cable at a known distance from the connection thereto of said object, for pivotal movement about a horizontal axis, to swim in a horizontal direction during different inclinations of said cable, said depth meter having capacitative means controlled by the pressure of the water thereon at the depth to which it may be submerged for causing emission into the water of vibratory signals at a frequency proportional to said water pressure, a receiving hydrophone, another relatively long flexible cable connected at one end to said ship and at its other end to said hydrophone, with said another cable towing said hydrophone behind said ship near the upper level of the water, whereby the hydrophone can pick up the signals emitted by said depth meter and by the frequency of the received signals indicate the depth of the meter, with a minimum of interference from the sounds created by the ship and propagated in the water.

15. A telemetering device for continuously indicating the depth in water at which an object is being towed by a ship, which comprises said ship, a relatively long, flexible cable attached at one end to said ship and at its other end carrying a weighted drag that causes such cable to descend in the water while being towed, means for connecting said object to said cable intermediate of the ends of said cable by which said object may be towed approximately horizontally at a desired level, a depth meter connected to that part of said cable at a known distance from the connection thereto of said object, for horizontal swiveling about said cable and also pivotal movement about a horizontal axis, to swim in a horizontal direction during different inclinations of said cable, said depth meter having capacitative means controlled by the pressure of the water thereon at the depth to which it may be submerged for causing emission into the water of vibratory signals at a frequency proportional to said water pressure, a receiving hydrophone, another relatively long flexible cable connected at one end to said ship and at its other end to said hydrophone, with said another cable towing said hydrophone behind said ship near the upper level of the water, whereby the hydrophone can pick up the signals emitted by said depth meter and by the frequency of the received signals indicate the depth of the meter, with a minimum of interference from the sounds created by the ship and propagated in the water.

16. The method of continuously ascertaining the depth at which an object is being towed in water by and behind a ship, which comprises towing a weight in the water by a flexible cable, towing said object from an intermediate part of said cable also towing from the same cable near to, and at a known distance along said cable from said intermediate part from which said object is towed, an element responsive to the water pressure around it and propagating in the water around it, acoustic signals that have a frequency proportional to and varying with the water pressure around said element, and picking up said propagated signals at a substantial distance well away from said ship to reduce confusion of said signals by the noise of said ship.

17. A telemetering device for continuously indicating the elevation of an instrument being towed horizontally in a fluid medium relatively to a horizontal reference plane, which comprises a towing vehicle, a tow cable secured for towing at one end to said vehicle at approximately said plane, means attached to the other end of said cable for causing said cable when towed to extend away from said vehicle and at an acute angle to said plane in said medium, means pivotally attached to said cable at a distance from said plane but before reaching said attached means and having a capacitor adjusted by the fluid pressure thereon of said medium where it is located at any time, for emitting acoustic signals into said medium for transmission therethrough and automatically variable in some characteristic according to variations of said capacitor in response to the fluid pressure thereon of said medium at different elevations where said means with said capacitor may be located, and means located adjacent said reference plane and responsive to said acoustic signals for indicating at approximately said reference plane, the current level position of the signal emitting means in said medium.

18. The device as set forth in claim 17, in which said characteristic of the signals is the frequency of said signals.

References Cited in the file of this patent

UNITED STATES PATENTS

| | | |
|---|---|---|
| 1,803,928 | Vigneron | May 5, 1931 |
| 1,991,658 | Clark | Feb. 19, 1935 |
| 2,065,634 | Warrick | Dec. 29, 1936 |
| 2,368,278 | Warshaw | Jan. 30, 1945 |
| 2,403,603 | Korn | July 9, 1946 |
| 2,547,875 | Krasnow | Apr. 3, 1951 |
| 2,547,876 | Krasnow | Apr. 3, 1951 |
| 2,669,877 | Dunlop | Feb. 23, 1954 |
| 2,674,049 | James | Apr. 6, 1954 |
| 2,729,910 | Fryklund | Jan. 10, 1956 |
| 2,750,794 | Downs | June 19, 1956 |
| 2,783,459 | Lienau | Feb. 26, 1957 |
| 2,853,824 | Schutz et al. | Sept. 30, 1958 |